United States Patent
Marlow et al.

(10) Patent No.: US 8,527,623 B2
(45) Date of Patent: Sep. 3, 2013

(54) USER VACILLATION DETECTION AND RESPONSE

(75) Inventors: Cameron Marlow, New York, NY (US); Sihem Amer-Yahia, New York, NY (US); Ronald J. Brachman, Westfield, NJ (US); Frederick K. Schmidt, Califon, NJ (US)

(73) Assignee: Yahoo! Inc., Sunnyvale, CA (US)

( * ) Notice: Subject to any disclaimer, the term of this patent is extended or adjusted under 35 U.S.C. 154(b) by 1655 days.

(21) Appl. No.: 11/963,493

(22) Filed: Dec. 21, 2007

(65) Prior Publication Data

US 2009/0164557 A1     Jun. 25, 2009

(51) Int. Cl.
*G06F 15/16* (2006.01)
*G06F 15/173* (2006.01)
*G06Q 30/00* (2012.01)

(52) U.S. Cl.
USPC .......................... 709/224; 709/206; 705/14.53

(58) Field of Classification Search
USPC .................... 709/206, 224; 705/14.49–14.67
See application file for complete search history.

(56) References Cited

U.S. PATENT DOCUMENTS

| | | | |
|---|---|---|---|
| 6,611,814 B1 | 8/2003 | Lee et al. | |
| 7,437,368 B1 * | 10/2008 | Kolluri et al. | 1/1 |
| 2002/0019763 A1 | 2/2002 | Linden et al. | |
| 2005/0266866 A1 | 12/2005 | Ahya et al. | |
| 2006/0112353 A1 * | 5/2006 | Okamoto et al. | 715/810 |
| 2006/0224615 A1 * | 10/2006 | Korn et al. | 707/102 |
| 2007/0005437 A1 | 1/2007 | Stoppelman | |
| 2007/0136457 A1 | 6/2007 | Dai et al. | |
| 2008/0004986 A1 * | 1/2008 | Choe | 705/26 |
| 2009/0083414 A1 * | 3/2009 | Lazovsky et al. | 709/224 |

FOREIGN PATENT DOCUMENTS

| | | | |
|---|---|---|---|
| JP | 2004246863 A * | 9/2004 | |
| KR | 1020030085314 | 11/2003 | |
| TW | 418588 B | 1/2001 | |
| WO | 2009085697 A1 | 7/2009 | |

* cited by examiner

*Primary Examiner* — Jeong S Park
(74) *Attorney, Agent, or Firm* — James J. DeCarlo; Greenberg Traurig, LLP

(57) ABSTRACT

An embodiment of the present invention automatically detects when a user is in a state of vacillation based on user on-line behavior, records relevant parameters regarding the vacillation event, and then responds accordingly. This response may include providing relevant and/or targeted information that can be used by the user to help remove the indecision. The response may also or alternatively include providing third-party businesses, such as retailers, marketers, and advertisers, with information about vacillation events and associated behaviors for a single user or groups of users so that such businesses can identify potential markets/customers or directly engage similar users to facilitate the decision-making process.

23 Claims, 6 Drawing Sheets

USER VACILLATION DETECTION AND RESPONSE

BACKGROUND OF THE INVENTION

1. Field of the Invention

The invention generally relates to systems and methods for automatically detecting and responding to the on-line behavior of a user or users.

2. Background

In online commerce, consumers face an increasingly large number of virtual storefronts, prices, and purchase options and incentives. As a result, Internet users are often caught in a state of indecision—vacillating between products, vacillating between vendors, vacillating between service providers, and the like. It would be beneficial if a computer system could detect when individuals are in a state of indecision and then respond accordingly. For example, the response might include providing relevant and/or targeted information that could be used by the individuals to help remove the uncertainty. As another example, the response might include providing third-party businesses, such as retailers, marketers, and advertisers, with information about vacillating users so that such businesses can identify potential markets/customers or directly engage such users to facilitate the decision-making process. Unfortunately, no such system currently exists.

BRIEF SUMMARY OF THE INVENTION

An embodiment of the present invention automatically detects when a user is in a state of vacillation based on user on-line behavior, records the relevant parameters regarding the vacillation event, and then responds accordingly. This response may include providing relevant and/or targeted information that can be used by the user to help remove the indecision. The response may also or alternatively include providing third-party businesses, such as retailers, marketers, and advertisers, with information about vacillation events and associated behaviors for a single user or groups of users so that such businesses can identify potential markets/customers or directly engage similar users to facilitate the decision-making process.

In particular, a method for detecting and responding to user vacillation is described herein. In accordance with the method, information associated with on-line behavior of a user is obtained. The obtained information may be associated with on-line activities performed by the user during one or more Internet browsing sessions or with on-line activities performed by the user via one or more client systems or devices. A vacillation pattern is then automatically detected based on the obtained information. Detecting the vacillation pattern may include, for example, detecting a pattern of vacillating between potentially purchasing different objects or detecting a pattern of vacillating between potentially purchasing and not purchasing a single object. Information relating to at least one object associated with the vacillation pattern is then presented to the user in response to the detection of the vacillation pattern. The information relating to the at least one object may include, for example, supplemental information associated with the at least one object, an advertisement associated with the at least one object, and/or a commercial incentive associated with the at least one object. The at least one object may comprise, for example, a product, service or vendor.

The foregoing method may further include constructing a vacillation event data structure based on the obtained information in response to detecting the vacillation pattern, wherein the vacillation event data structure identifies one or more objects associated with the vacillation pattern. In such an embodiment, providing the information relating to at least one object associated with the vacillation pattern may include providing information relating to at least one object identified in the vacillation event data structure.

An alternate method for detecting and responding to user vacillation is also described herein. In accordance with the alternate method, information associated with on-line behavior of a user is obtained. A vacillation pattern is then automatically detected based on the obtained information. Information associated with the vacillation pattern is then stored in a data warehouse. The stored information is then provided to a business entity, wherein the business entity comprises one of a retailer, marketer or advertiser.

In accordance with the foregoing method, storing the information associated with the vacillation pattern in the data warehouse may include constructing a vacillation event data structure based on the obtained information, wherein the vacillation event data structure identifies one or more objects associated with the vacillation pattern, and storing the vacillation event data structure in the data warehouse. Storing the information associated with the vacillation pattern in the data warehouse may also include storing feedback information associated with on-line behavior of the user in response to the presentation to the user of information relating to at least one object associated with the vacillation pattern.

In further accordance with the foregoing method, providing the stored information to a business entity may include generating statistical information derived from an analysis of the behavior of a plurality of users, wherein the generation of the statistical information is based in part on the stored information, and providing the statistical information to the business entity.

A system for detecting and responding to user vacillation is also described herein. The system includes one or more logs, a vacillation detector and a vacillation presentation system. The one or more logs are configured to store information associated with on-line behavior of a user, such as, for example, information associated with on-line activities performed by the user during one or more Internet browsing sessions and/or information associated with on-line activities performed by the user via one or more client systems or devices. The vacillation detector is configured to obtain the information associated with the on-line behavior of the user from the one or more logs and to automatically detect a vacillation pattern based on the obtained information. The vacillation pattern may comprise, for example, a pattern of vacillating between potentially purchasing different objects or a pattern of vacillating between potentially purchasing and not purchasing a single object. The vacillation presentation system is configured to provide information relating to at least one object associated with the vacillation pattern to the user in response to the detection of the vacillation pattern by the vacillation detector. For example, the vacillation presentation system may be configured to provide at least one of supplemental information associated with the at least one object, an advertisement associated with the at least one object, and a commercial incentive associated with the at least one object. The at least one object associated with the vacillation pattern may comprise one of a product, service or vendor.

In an embodiment, the foregoing system further includes a vacillation packager. The vacillation packager is configured to construct a vacillation event data structure based on the obtained information in response to the detection of the vacillation pattern by the vacillation detector, wherein the vacillation event data structure identifies one or more objects associated with the vacillation pattern. In accordance with such an embodiment, the vacillation presentation system is configured to provide information relating to at least one object identified in the vacillation event data structure.

An alternate system for detecting and responding to user vacillation is also described herein. The alternate system includes one or more logs, a vacillation detector, a vacillation packager and a third-party distribution system. The one or more logs are configured to store information associated with on-line behavior of a user. The vacillation detector is configured to obtain the information associated with the on-line behavior of the user from the one or more logs and to automatically detect a vacillation pattern based on the obtained information. The vacillation packager is configured to store information associated with the vacillation pattern in a data warehouse. The third-party distribution system is configured to provide the stored information to a business entity, wherein the business entity comprises one of a retailer, marketer or advertiser.

In accordance with the foregoing system, the vacillation packager may be configured to construct a vacillation event data structure based on the obtained information in response to the detection of the vacillation pattern by the vacillation detector, wherein the vacillation event data structure identifies one or more objects associated with the vacillation pattern, and to store the vacillation event data structure in the data warehouse. The vacillation packager may also be configured to store feedback information in the data warehouse, wherein the feedback information is associated with on-line behavior of the user in response to the presentation to the user of information relating to at least one object associated with the vacillation pattern.

In further accordance with the foregoing system, the third-party distribution system is configured to generate statistical information derived from an analysis of the behavior of a plurality of users, wherein the generation of the statistical information is based in part on the stored information and to provide the statistical information to the business entity.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
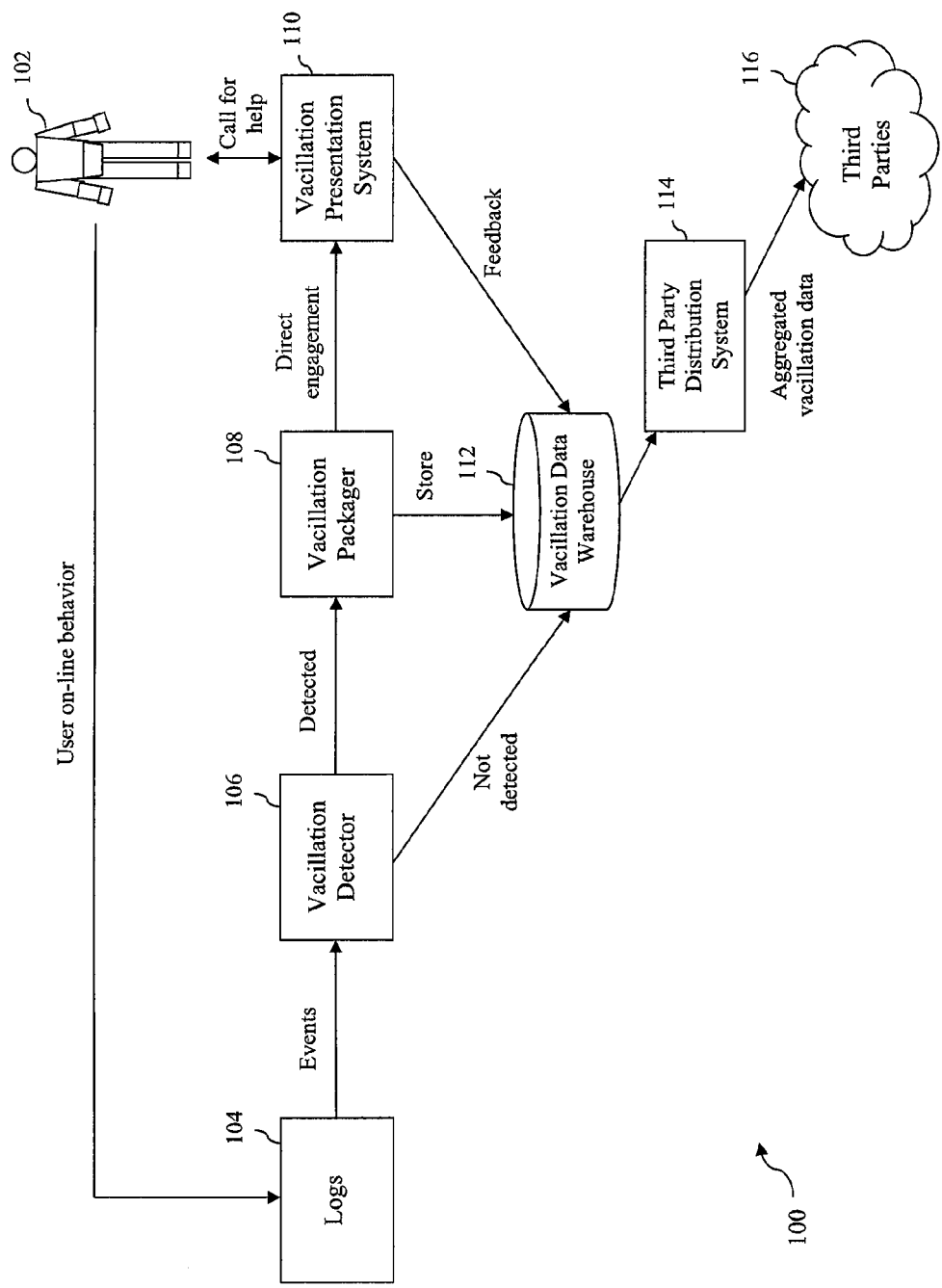
FIG. 1 is a high-level block diagram of a system that automatically detects and responds to user vacillation in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Example System for User Vacillation Detection and Response

FIG. 1 is a high-level block diagram of a system 100 that automatically detects and responds to user vacillation in accordance with an embodiment of the present invention. As will be described in more detail herein, system 100 advantageously provides a generalized framework for finding, interpreting and acting on a very common form of user behavior—namely, user vacillation or indecision. Each of the elements of system 100 will now be briefly described, with additional details to be provided in subsequent sections.

As shown in FIG. 1, information associated with the on-line behavior of a user 102 is generated and stored in one or more logs 104. This data may include, for example, Web pages or Web sites visited or viewed, entities interacted with on a Web page, advertisements displayed, queries made, or the like.

A vacillation detector 106 is configured to obtain certain information (denoted "events") from logs 104 and to use such information to infer vacillations patterns associated with user 102. To perform this function, vacillation detector 106 is configured to accurately model the indecision of a user and detect cases in which a user engages in repetitive behavior. Once vacillation detector 106 has detected a vacillation pattern associated with user 102, vacillation detector 106 passes information associated with the detected vacillation pattern to a vacillation packager 108.

Vacillation packager 108 obtains information associated with detected vacillation patterns from vacillation detector 106 and uses such information to construct a Vacillation Event Model (VEM). As will be described in more detail herein, a VEM is a data structure that includes core information about a detected vacillation pattern.

After a VEM has been constructed, at least two actions may be taken with respect to the VEM. First, the VEM can be used to directly engage user 102 in a decision-making process via a vacillation presentation system 110. Vacillation presentation system 110 is configured to provide a vacillation presentation to user 102 via a user interface. Such a vacillation presentation may include, for example, supplemental information for a user in a state of vacillation, advertising relating to products, services or vendors involved in the vacillation, or coupons or other commercial incentives for a product, service or vendor involved in the vacillation.

Second, the VEM may be stored in a vacillation data warehouse 112. Vacillation data warehouse 112 can thus act as a repository for VEMs associated with multiple users. As shown in FIG. 1, other supplemental data that may be stored in vacillation data warehouse 112 may include events data that did not result in the detection of a vacillation pattern by vacillation detector 106 and/or feedback obtained from user 102 during the engagement and decision making process initiated by vacillation presentation system 110.

Data stored in vacillation data warehouse 112 can advantageously be used to generate statistics about user behavior in general. For example, such statistics may relate to relationships between objects and audiences, relationships between objects, relationships between information sources and detected vacillation events, and relationships between objects and vacillation presentation outcomes. As used herein, the term object refers to any artifact that can act as a source of user indecision, including but not limited to products, services or vendors. For example, and without limitation, an object may comprise a digital camera, a loan provider, a vacation package, or a competitive store for digital goods.

The VEMs and supplemental information stored in vacillation data warehouse 112 as well as the statistics generated therefrom can advantageously be used to improve the performance of vacillation detector 106 by providing a basis for enhancing the modeling of user vacillation. Furthermore, such information may be monetized by selling it to third parties 116, such as retailers, marketers, and advertisers, which may use such information to identify potential markets/customers and to engage vacillating users in a manner independent of that shown in FIG. 1. This information may be provided to third parties 116 via a third-party distribution system 114. The information may be compiled and provided to third parties 116 in real time in response to the activities of user 102 or compiled as statistics off-line ex post facto.

System 100 also provides an optional "null" vacillation presentation that may be implemented in the form of a user call-out. For example, although vacillation detector 106 may not detect vacillation on the part of user 102, an interface may nevertheless be provided to user 102 by which user 102 can request engagement in a decision-making process. For example, the interface may comprise a button or other selectable user interface object that essentially states "Help, I cannot decide." Any actions performed in response to user engagement via this "null" vacillation presentation may provide the same outcomes as any other vacillation presentation described herein.

1. Collection of User On-Line Behavior Information

Figure 2:
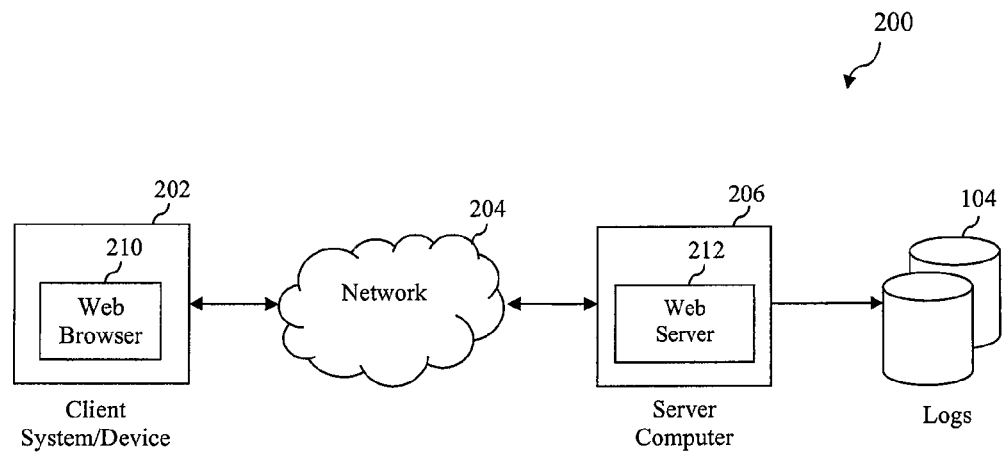
FIG. 2 is a block diagram of an example system by which user on-line behavior information may be collected and stored in logs in accordance with an embodiment of the present invention.

FIG. 2 depicts an example system 200 by which user on-line behavior information may be collected and stored in logs 104 in accordance with an embodiment of the present invention. As shown in FIG. 2, system 200 includes a client system/device 202 that is communicatively connected to a server computer 206 via a network 204. In one implementation, network 204 comprises the Internet. However, the invention is not so limited and network 204 may comprise any type of network or combination of networks including wide area networks, local area networks, private networks, public networks, packet networks, circuit-switched networks, and wired or wireless networks.

Server computer 206 is a processor-based machine or system that is configured to execute a Web server 212. Generally speaking, Web server 212 is a computer program that is configured to receive HTTP (Hypertext Transfer Protocol) requests from one or more Web browsers, such as a Web browser 210 executing on client system/device 202, and to serve HTTP responses to the Web browsers in response to receiving the requests. Such HTTP responses may be served with data content, which usually comprises Web pages such as HTML documents and linked objects.

Web pages received by Web browser 210 are displayed to a user via a user interface of client system/device 202. Web browser 210 is configured to allow the user to interact in a well-known manner with objects within the Web pages to issue requests to Web server 212 and to receive further content in response to those requests. Client system/device 202 is intended to represent any processor-based system or device capable of running a Web browser or like software for requesting and receiving content over a network. Client system/device 202 may comprise, for example and without limitation, a personal computer, a laptop computer, a game console, cellular telephone, personal digital assistant, portable media player, or the like.

In accordance with an embodiment of the present invention, information associated with certain activities performed or initiated by a user of Web browser 210 while in communication with Web server 212 are recorded in logs 104. Logs 104 are databases that are stored in memory that may be either internal or external with respect to server computer 206. The information stored in logs 104 is thus representative of the on-line behavior of a user. An example of information that may be stored in logs 104 includes Web pages or Web sites visited or viewed, entities interacted with on a Web page, advertisements displayed, queries made, or the like. Other examples of information that may be stored in logs 104 include keywords, objects, qualifiers (metadata about objects), classes of objects, accessories to objects, and/or reviews of objects.

Figure 3:
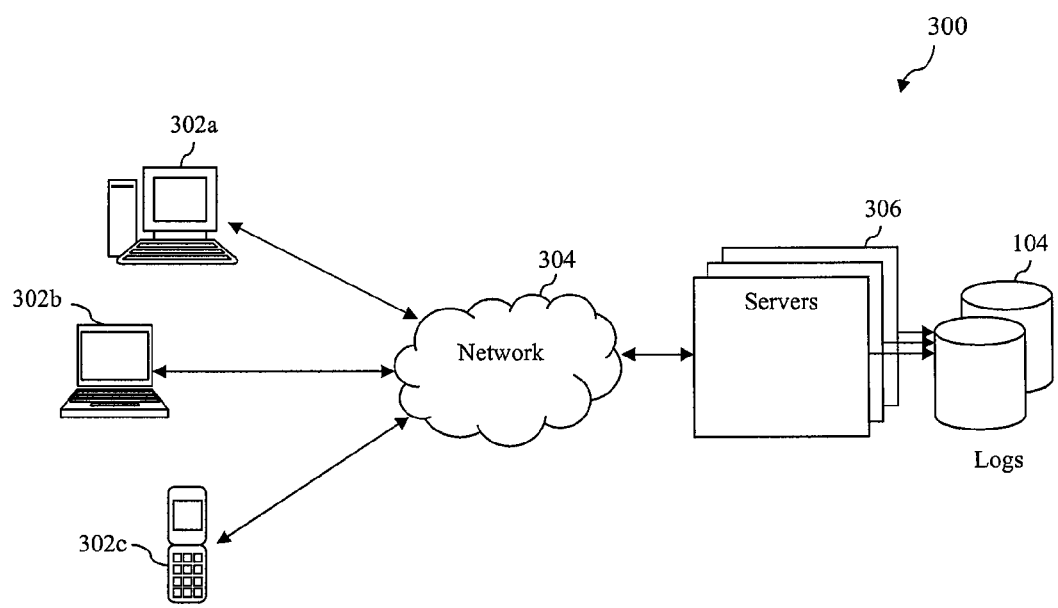
FIG. 3 is a block diagram of an example system by which user on-line behavior information may be collected from a plurality of different client systems/devices and stored in logs in accordance with an embodiment of the present invention.

Information associated with the activities of a user may be collected during a single Web-browsing session initiated from client system/device 202 or across multiple Web-browsing sessions initiated from client system/device 202. The information may also be collected from user interaction with one or multiple Web sites. Such Web sites may include, for example, shopping Web sites or search Web sites. Furthermore, such user on-line behavior information may be generated by a user based on network interactions originating from a plurality of different client systems/devices. For example, as shown in system 300 of FIG. 3, a single user may engage in on-line activities via a plurality of client systems/devices such as a personal computer system 302_a_, a laptop computer 302_b_ and a cellular telephone 302_c_. In accordance with an embodiment of the present invention, servers 306 (which are communicatively connected to client systems/devices 302_a_, 302_b_ and 302_c_ via a network 304) each record information associated with certain on-line activities performed or initiated by the user of client systems/devices 302_a_, 302_b_ and 302_c_ in logs 104.

2. Vacillation Detection

As discussed above in reference to system 100 of FIG. 1, vacillation detector 106 is configured to obtain certain information (denoted "events") from logs 104 and to use such information to infer vacillation patterns associated with user 102. A vacillation pattern may include, for example, a pattern of vacillating between potentially purchasing different objects or a pattern of vacillating between potentially purchasing and not purchasing a single object. As noted above, the term object may refer to any artifact that can act as a source of user indecision, including but not limited to products, services or vendors.

The information obtained from logs 104 by vacillation detector 106 for the purposes of performing vacillation detection may include structured information. For example, structured information obtained from logs 104 may include, but is not limited to, time spent by a user on two distinct product reviews, information indicating that a user is searching for two competitive travel offers, information indicating that a user viewed the same Web page(s) at different times of a day, information indicating that a user nearly completed but did not finalize a transaction, information indicating that a user revisited the same Web page during the same on-line session or across multiple on-line sessions, information indicating that a user has looked at objects in the same class or category, information that a user has moved between different objects in the same class or category, information indicating that a user has moved between the same object across two vendors, qualifiers for objects provided by a user, or information indicating that a user performed a search using the same keywords iteratively. These examples are not intended to be limiting and persons skilled in the relevant art(s) will appreciate that other structured information may be used to infer vacillation patterns associated with user 102.

The information obtained from logs 104 by vacillation detector 106 for the purposes of performing vacillation detection may also include unstructured information. Such unstructured information may include, for example, user reviews or feedback about an object. Vacillation detector 106 may be configured to perform sentiment analysis or entity extraction upon such unstructured text to determine whether it includes content that can be used to infer a vacillation pattern.

Once vacillation detector 106 has detected a vacillation pattern associated with user 102, vacillation detector 106 passes information associated with the detected vacillation pattern to a vacillation packager 108.

3. Vacillation Packaging

As also discussed above in reference to system 100 of FIG. 1, vacillation packager 108 is configured to obtain information associated with detected vacillation patterns from vacillation detector 106 and to use such information to construct a Vacillation Event Model (VEM). A VEM is a data structure that stores information about a detected vacillation pattern in a common format that facilitates analysis and comparison. In an embodiment in which VEMs are provided to third-party businesses, the use of a common format makes it easier for such third-party businesses to understand, use and even augment or extend the data structure.

In one embodiment, the VEM is described by the following form:

$$\text{user } u_1, \text{objects } O_1 \ldots O_n, \text{strength } S_1 \ldots S_n$$

wherein u1 is a unique identifier associated with a particular user, $O_1 \ldots O_n$ are the objects about which the user is vacillating, and $S_1 \ldots S_n$ is the degree of vacillation demonstrated by the user with respect to each of the corresponding objects $O_1 \ldots O_n$. Metadata about a particular user, object, or vacillation pattern may also be included to supplement this core VEM data structure. By way of example, such metadata may include but is not limited to information concerning how many times a particular Web page was visited, specific query terms or keywords submitted by a user, additional user demographics, or the like.

After a VEM has been constructed, at least two actions may be taken with respect to the VEM. First, the VEM can be used to directly engage user 102 in a decision-making process via a vacillation presentation system 110. Second, the VEM may be stored in a vacillation data warehouse 112.

4. Vacillation Presentation

Vacillation presentation system 110 makes use of VEMs constructed by vacillation packager 108 to directly engage user 102 in a decision-making process. Vacillation presentation system 110 is configured to perform this function by providing information to user 102 via a user interface of a client system/device. Such information may include, for example, supplemental information for a user in a state of vacillation, advertising relating to products, services or vendors involved in the vacillation, or coupons or other commercial incentives for a product, service or vendor involved in the vacillation.

In accordance with an embodiment of the present invention, vacillation presentation system 110 may be used to provide an intervention that is much richer than a simple resource or suggestion. For example, such an intervention may take the form of a detailed "how-to" guide for aiding in a purchase decision, an identification of related objects that extend beyond a user's search, an identification of an object that most individuals ended their vacillation with, or an identification of other users who are currently vacillating with respect to the same or similar objects, topics or resources.

In accordance with one implementation, the vacillation presentation delivered by system 110 initially requests user 102 to indicate whether or not he/she is actually vacillating. If user 102 responds positively, then the presentation may proceed, whereas if user 102 responds negatively, then the presentation may be aborted. The user response to this inquiry may also be provided as feedback for use in improving the performance of vacillation detector 106. In one embodiment, the feedback is processed directly by a machine learning algorithm within vacillation detector 106.

In accordance with another implementation, the content or appearance of a Web page is automatically modified or augmented to take into account the state of vacillation of the user. For example, if a user has left a first Web page offering a first product for sale to visit a second Web page offering a competing product for sale and then returns to the first Web page, the first Web page may be automatically modified to take into account the state of indecision of the user. These modifications may include the provision of additional information explaining differences between the competing products or a coupon or discount with respect to the first product.

As noted above, vacillation presentation system 110 may optionally be configured to provide a "null" vacillation presentation that may be implemented in the form of a user call-out. For example, although vacillation detector 106 may not detect vacillation on the part of user 102, an interface may nevertheless be provided to user 102 by which user 102 can request engagement in a decision-making process. For example, the interface may comprise a button or other selectable user interface object that essentially states "Help, I cannot decide." Any actions performed in response to user engagement via this "null" vacillation presentation may provide the same outcomes as any other vacillation presentation described herein.

Figure 4:
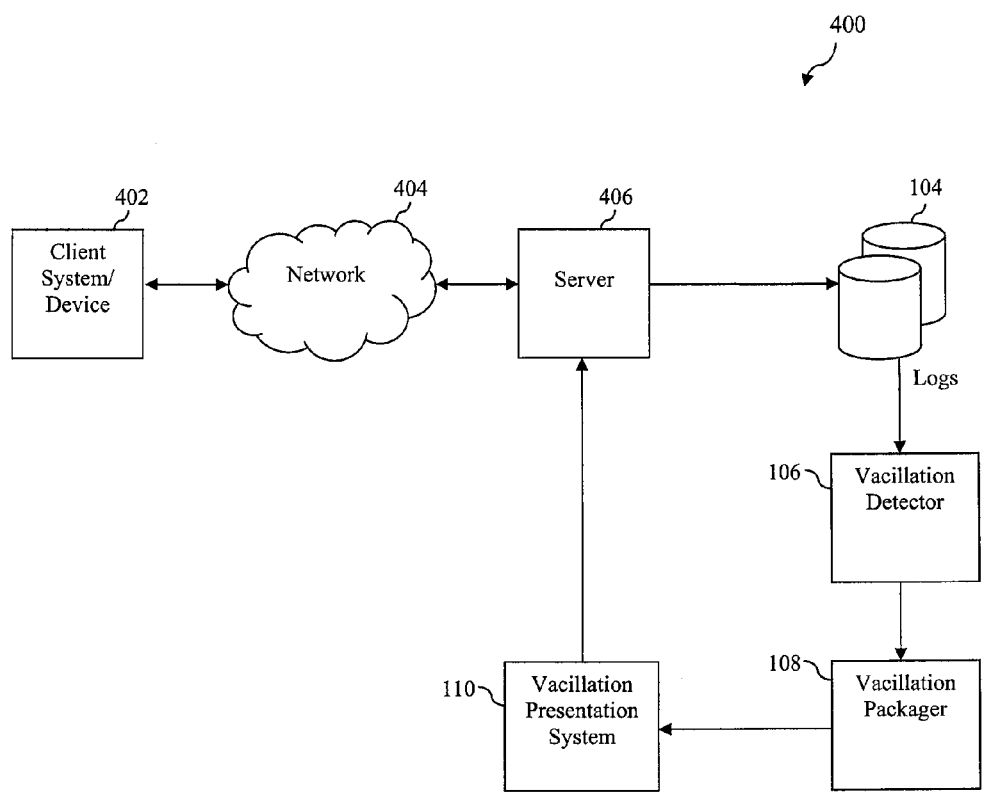
FIG. 4 is a block diagram of an example system by which a vacillation presentation may be provided to a user in accordance with an embodiment of the present invention.

The vacillation presentation may occur within the context of the same on-line session during which information associated with the on-line behavior of user 102 is obtained. FIG. 4 is a block diagram of an example system 400 that would facilitate this. As shown in FIG. 4, a user of a client system/device 402 engages in on-line activities with a server 406 via a network 404. Information associated with the on-line behavior of the user is stored in logs 104. Vacillation detector 106 obtains such information from logs 104 and detects a vacillation pattern therefrom. Information associated with the vacillation pattern is used by vacillation packager 108 to construct a VEM. Based on the VEM, vacillation presentation system 110 presents a vacillation presentation to the user via server 406 during the same on-line session from which the user on-line behavior information was obtained.

In alternate embodiments, vacillation presentation system 110 may present the vacillation presentation to user 102 during a different on-line session than the session in which the user on-line behavior information was obtained or send such information to a different client system/device than the one from which the user on-line behavior information was obtained. Furthermore, the vacillation presentation may be delivered to the user off-line. For example, the vacillation presentation may be sent as a message to the user after the user has logged off a session.

B. Example Methods for User Vacillation Detection and Response

Figure 5:
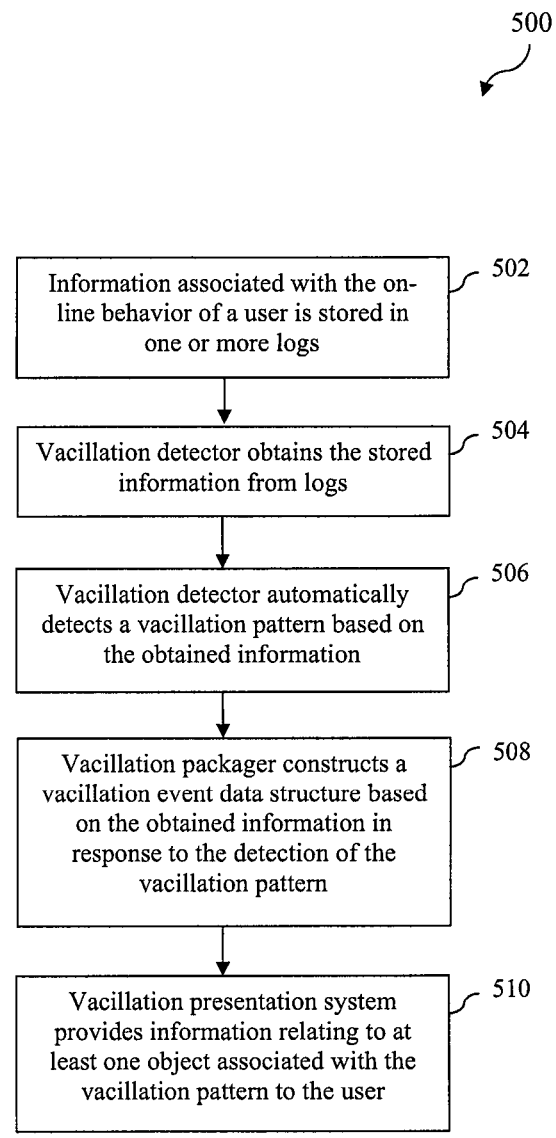
FIG. 5 is a flowchart of a first method for detecting and responding to user vacillation in accordance with an embodiment of the present invention.

FIG. 5 is a flowchart of a method 500 for detecting and responding to user vacillation in accordance with an embodiment of the present invention. The steps of flowchart 500 will now be described with continued reference to system 100 of FIG. 1, although the method is not limited to that implementation.

At step 502, information associated with the on-line behavior of user 102 is stored in one or more logs 104. The information may include information associated with on-line activities performed by user 102 during one or more Internet browsing sessions. The information may also include information associated with on-line activities performed by user 102 via one or more client systems or devices.

At step 504, vacillation detector 106 obtains the information from logs 104 and, at step 506, vacillation detector 106 automatically detects a vacillation pattern based on the obtained information. Detecting the vacillation pattern may include detecting a pattern of vacillating between potentially purchasing different objects. Detecting the vacillation pattern may also include detecting a pattern of vacillating between potentially purchasing and not purchasing a single object.

At step 508, vacillation packager 108 constructs a vacillation event data structure based on the obtained information in response to the detection of the vacillation pattern by vacillation detector 106. In an embodiment, the vacillation event data structure identifies one or more objects associated with the vacillation pattern.

At step 510, vacillation presentation system 110 provides information relating to at least one object associated with the vacillation pattern to user 102 in response to the detection of the vacillation pattern. In an embodiment, the at least one object comprises one of a product, service or vendor. In a further embodiment, the provided information includes at least one of: supplemental information associated with the at least one object, an advertisement associated with the at least one object, and a commercial incentive (e.g., a coupon) associated with the at least one object. Providing the information relating to the at least one object may include providing information relating to at least one object identified in a vacillation event data structure. Providing the information relating to the at least one object may also include providing the information during the same Internet browsing session in which the user on-line behavior information was obtained for storage in logs 104.

Figure 6:
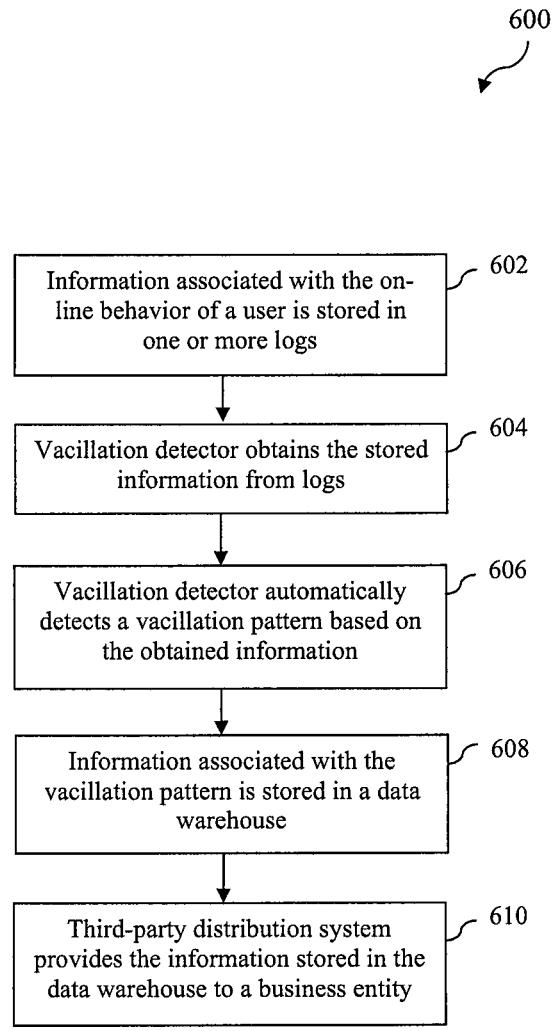
FIG. 6 is a flowchart of a second method for detecting and responding to user vacillation in accordance with an embodiment of the present invention.

FIG. 6 is a flowchart of a method 600 for detecting and responding to user vacillation in accordance with an alternate embodiment of the present invention. The steps of flowchart 600 will now be described with continued reference to system 100 of FIG. 1, although the method is not limited to that implementation.

At step 602, information associated with the on-line behavior of user 102 is stored in one or more logs 104.

At step 604, vacillation detector 106 obtains the information from logs 104 and, at step 606, vacillation detector 106 automatically detects a vacillation pattern based on the obtained information.

At step 608, information associated with the vacillation pattern is stored in a data warehouse (e.g., vacillation data warehouse 112). This step may include the construction of a vacillation event data structure by vacillation packager 108 based on the obtained information and the storage of the vacillation event data structure in the data warehouse. In an embodiment, the vacillation event data structure identifies one or more objects associated with the vacillation pattern. Step 608 may also include storing feedback information associated with on-line behavior of the user in response to the presentation to the user of information relating to at least one object associated with the vacillation pattern.

At step 610, third-party distribution system 114 provides the information stored in the data warehouse in step 608 to a business entity. The business entity may comprise one of a retailer, marketer or advertiser. Providing the stored information to the business entity may include generating statistical information concerning the behavior of a plurality of users, wherein the generation of the statistical information is based in part on the stored information, and providing the statistical information to the business entity.

C. Example Computer System Implementation

Various elements depicted in FIGS. 1-4 as well as each of the methods or steps depicted in FIGS. 5 and 6 may be implemented using any well-known processor-based computer system. An example of such a computer system 700 is depicted in FIG. 7.

Figure 7:
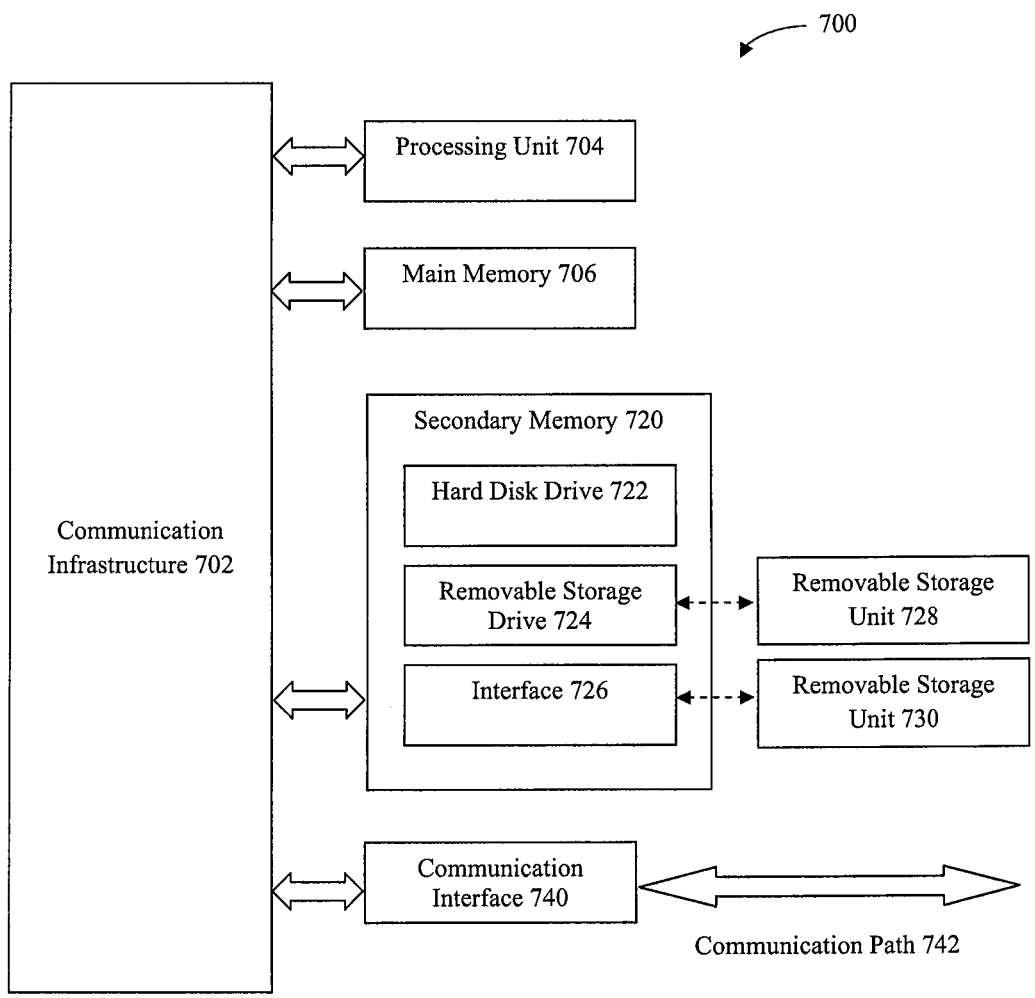
FIG. 7 is a block diagram of a computer system that may be used to implement aspects of the present invention.

As shown in FIG. 7, computer system 700 includes a processing unit 704 that includes one or more processors. Processor unit 704 is connected to a communication infrastructure 702, which may comprise, for example, a bus or a network.

Computer system 700 also includes a main memory 706, preferably random access memory (RAM), and may also include a secondary memory 720. Secondary memory 720 may include, for example, a hard disk drive 722, a removable storage drive 724, and/or a memory stick. Removable storage drive 724 may comprise a floppy disk drive, a magnetic tape drive, an optical disk drive, a flash memory, or the like. Removable storage drive 724 reads from and/or writes to a removable storage unit 728 in a well-known manner. Removable storage unit 728 may comprise a floppy disk, magnetic tape, optical disk, or the like, which is read by and written to by removable storage drive 724. As will be appreciated by persons skilled in the relevant art(s), removable storage unit 728 includes a computer usable storage medium having stored therein computer software and/or data.

In alternative implementations, secondary memory 720 may include other similar means for allowing computer programs or other instructions to be loaded into computer system 700. Such means may include, for example, a removable storage unit 730 and an interface 726. Examples of such means may include a program cartridge and cartridge interface (such as that found in video game devices), a removable memory chip (such as an EPROM, or PROM) and associated socket, and other removable storage units 730 and interfaces 726 which allow software and data to be transferred from the removable storage unit 730 to computer system 700.

Computer system 700 may also include a communications interface 740. Communications interface 740 allows software and data to be transferred between computer system 700 and external devices. Examples of communications interface 740 may include a modem, a network interface (such as an Ethernet card), a communications port, a PCMCIA slot and card, or the like. Software and data transferred via communications interface 740 are in the form of signals which may be electronic, electromagnetic, optical, or other signals capable of being received by communications interface 740. These signals are provided to communications interface 740 via a communications path 742. Communications path 742 carries signals and may be implemented using wire or cable, fiber optics, a phone line, a cellular phone link, an RF link and other communications channels.

As used herein, the terms "computer program medium" and "computer usable medium" are used to generally refer to media such as removable storage unit 728, removable storage unit 730, a hard disk installed in hard disk drive 722, and signals received by communications interface 740. Computer program medium and computer useable medium can also refer to memories, such as main memory 706 and secondary memory 720, which can be semiconductor devices (e.g., DRAMs, etc.). These computer program products are means for providing software to computer system 700.

Computer programs (also called computer control logic, programming logic, or logic) are stored in main memory 706 and/or secondary memory 720. Computer programs may also be received via communications interface 740. Such computer programs, when executed, enable the computer system 700 to implement features of the present invention as discussed herein. Accordingly, such computer programs represent controllers of the computer system 700. Where the invention is implemented using software, the software may be stored in a computer program product and loaded into computer system 700 using removable storage drive 724, interface 726, or communications interface 740.

The invention is also directed to computer program products comprising software stored on any computer useable medium. Such software, when executed in one or more data processing devices, causes a data processing device(s) to operate as described herein. Embodiments of the present invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, zip disks, tapes, magnetic storage devices, optical storage devices, MEMs, nanotechnology-based storage device, etc.), and communication mediums (e.g., wired and wireless communication networks, local area networks, wide area networks, intranets, etc.).

D. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for detecting and responding to user vacillation, comprising:
obtaining, by a processor, information associated with on-line behavior of a user;
automatically detecting, by the processor, a vacillation pattern relating to at least one object based on the obtained information;
constructing, by the processor, a vacillation event data structure based on the obtained information in response to detecting the vacillation pattern, the vacillation event data structure comprises information associated with the user, the at least one object, and a degree of vacillation demonstrated by the user with respect to the at least one object; and
providing, by the processor, information relating to the at least one object associated with the vacillation pattern to the user in response to detecting the vacillation pattern.

2. The method of claim 1, wherein obtaining information associated with the on-line behavior of the user comprises:
obtaining, by the processor, information associated with on-line activities performed by the user during one or more Internet browsing sessions.

3. The method of claim 1, wherein obtaining information associated with the on-line behavior of the user comprises:
obtaining, by the processor, information associated with on-line activities performed by the user via one or more client systems or devices.

4. The method of claim 1, wherein detecting a vacillation pattern comprises:
detecting, by the processor, a pattern of vacillating between potentially purchasing different objects.

5. The method of claim 1, wherein detecting a vacillation pattern comprises:
detecting, by the processor, a pattern of vacillating between potentially purchasing and not purchasing a single object.

6. The method of claim 1, wherein providing information relating to at least one object associated with the vacillation pattern comprises providing, by the processor, information relating to at least one object identified in the vacillation event data structure.

7. The method of claim 1, wherein the at least one object associated with the vacillation pattern comprises one of a product, service or vendor.

8. The method of claim 1, wherein providing information relating to at least one object associated with the vacillation pattern comprises providing, by the processor, at least one of: supplemental information associated with the at least one object, an advertisement associated with the at least one object, and a commercial incentive associated with the at least one object.

9. The method of claim 1, wherein obtaining information associated with the on-line behavior of the user comprises obtaining, by the processor, information associated with on-line activities performed by a user during an Internet browsing session, and wherein providing information relating to at least one object associated with the vacillation pattern to the user comprises providing information relating to the at least one object during the same Internet browsing session.

10. A method for detecting and responding to user vacillation, comprising:
obtaining, by a processor, information associated with on-line behavior of a user;
automatically detecting, by the processor, a vacillation pattern relating to at least one object based on the obtained information;
constructing, by the processor, a vacillation event data structure based on the obtained information in response to detecting the vacillation pattern, the vacillation event data structure comprises information associated with the user, the at least one object, and a degree of vacillation demonstrated by the user with respect to the at least one object;

storing, by the processor, the vacillation event data structure in a data warehouse; and providing, by the processor, the stored information to a business entity, wherein the business entity comprises one of a retailer, marketer or advertiser.

11. The method of claim 10, wherein storing information associated with the detected vacillation pattern in a data warehouse comprises: storing, by the processor, feedback information associated with on-line behavior of the user in response to the presentation to the user of information relating to at least one object associated with the vacillation pattern.

12. The method of claim 10, wherein providing the stored information to a business entity comprises:

generating, by the processor, statistical information derived from an analysis of the behavior of a plurality of users, wherein the generation of the statistical information is based in part on the stored information; and providing, by the processor, the statistical information to the business entity.

13. A system for detecting and responding to user vacillation, comprising:

a processor;

a processor readable storage medium for tangibly storing thereon:

one or more logs configured to store information associated with on-line behavior of a user;

a vacillation detector configured to obtain the information associated with the on-line behavior of the user from the one or more logs and to automatically detect a vacillation pattern relating to at least one object based on the obtained information;

a vacillation packager that constructs a vacillation event data structure based on the obtained information in response to the detection of the vacillation pattern by the vacillation detector, wherein the vacillation event data structure comprises information associated with the user, the at least one object, and a degree of vacillation demonstrated by the user with respect to the at least one object; and a vacillation presentation system configured to provide information relating to the at least one object associated with the vacillation pattern to the user in response to the detection of the vacillation pattern by the vacillation detector.

14. The system of claim 13, wherein the one or more logs are configured to store information associated with on-line activities performed by the user during one or more Internet browsing sessions.

15. The system of claim 13, wherein the one or more logs are configured to store information associated with on-line activities performed by the user via one or more client systems or devices.

16. The system of claim 13, wherein the vacillation detector is configured to detect a pattern of vacillating between potentially purchasing different objects.

17. The system of claim 13, wherein the vacillation detector is configured to detect a pattern of vacillating between potentially purchasing and not purchasing a single object.

18. The system of claim 13, wherein the vacillation presentation system is configured to provide information relating to at least one object identified in the vacillation event data structure.

19. The system of claim 13, wherein the at least one object associated with the vacillation pattern comprises one of a product, service or vendor.

20. The system of claim 13, wherein the vacillation presentation system is configured to provide at least one of: supplemental information associated with the at least one object, an advertisement associated with the at least one object, and a commercial incentive associated with the at least one object.

21. A system for detecting and responding to user vacillation, comprising:

a processor;

a processor readable storage medium for tangibly storing thereon:

one or more logs configured to store information associated with on-line behavior of a user; a vacillation detector configured to obtain the information associated with the on-line behavior of the user from the one or more logs and to automatically detect a vacillation pattern based on the obtained information;

a vacillation packager that constructs and stores a data warehouse, a vacillation event data structure based on the obtained information in response to the detection of the vacillation pattern by the vacillation detector, wherein the vacillation event data structure comprises information associated with the user, the at least one object, and a degree of vacillation demonstrated by the user with respect to the at least one object; and a third-party distribution system configured to provide the stored information to a business entity, wherein the business entity comprises one of a retailer, marketer or advertiser.

22. The system of claim 21, wherein the vacillation packager is configured to store feedback information in the data warehouse, wherein the feedback information is associated with on-line behavior of the user in response to the presentation to the user of information relating to at least one object associated with the vacillation pattern.

23. The system of claim 21, wherein the third-party distribution system is configured to generate statistical information derived from an analysis of the behavior of a plurality of users, wherein the generation of the statistical information is based in part on the stored information and to provide the statistical information to the business entity.

* * * * *